2 Sheets—Sheet 2.

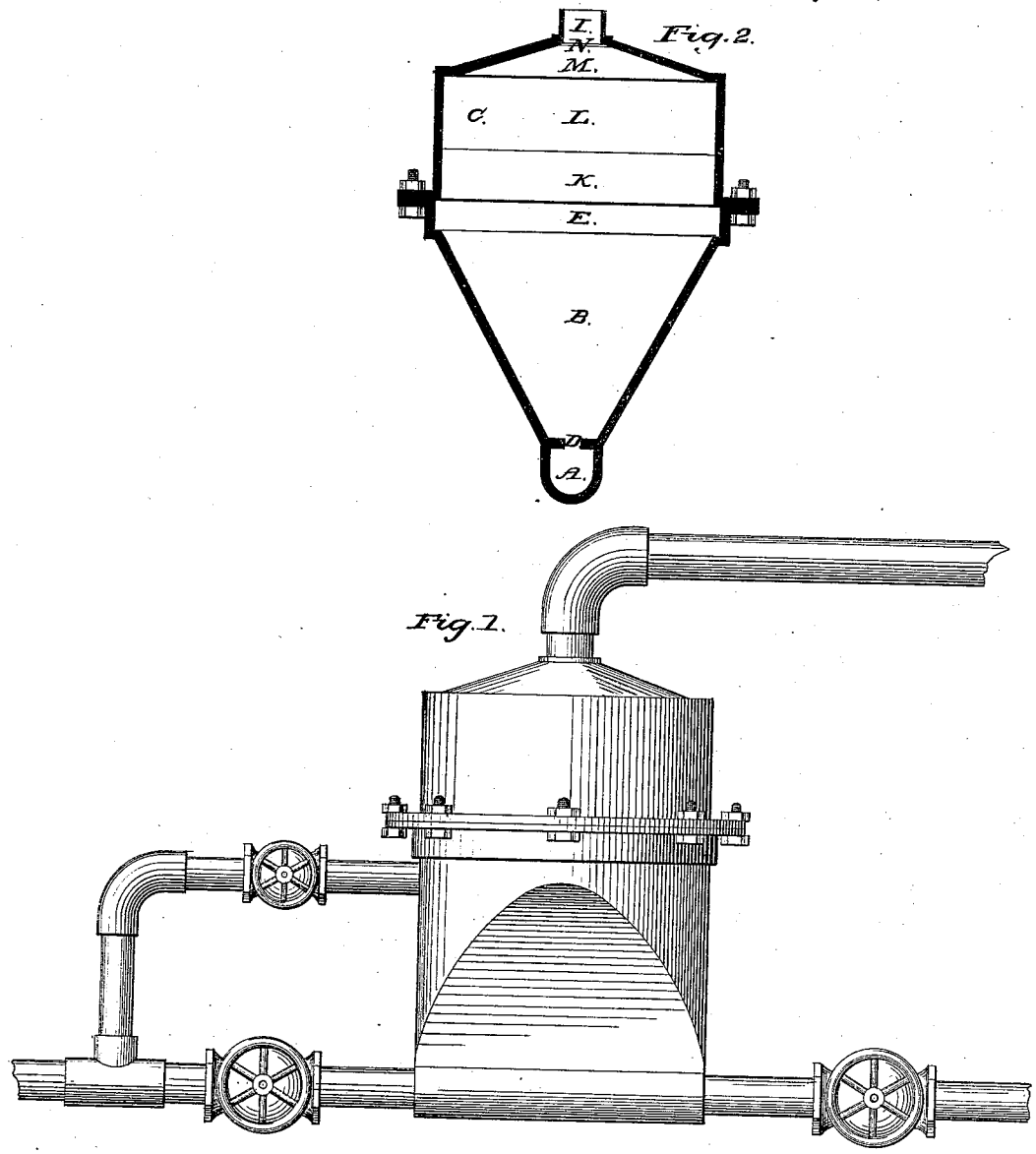

J. C. NICHOLS.
SERVICE-PIPE FILTERS.

No. 193,720. Patented July 31, 1877.

PLAN.

SECTION ON LINE R.S.

Witnesses.

Inventor

UNITED STATES PATENT OFFICE.

JOHN C. NICHOLS, OF ATLANTA, GEORGIA.

IMPROVEMENT IN SERVICE-PIPE FILTERS.

Specification forming part of Letters Patent No. 193,720, dated July 31, 1877; application filed May 31, 1877.

*To all whom it may concern:*

Be it known that I, JOHN C. NICHOLS, of Atlanta, in the county of Fulton and State of Georgia, have invented a new and useful Improvement in Service-Pipe Filters, which improvement is fully set forth in the following specification, reference being had to the accompanying drawings.

Similar letters of reference indicate corresponding parts.

Figure 4:
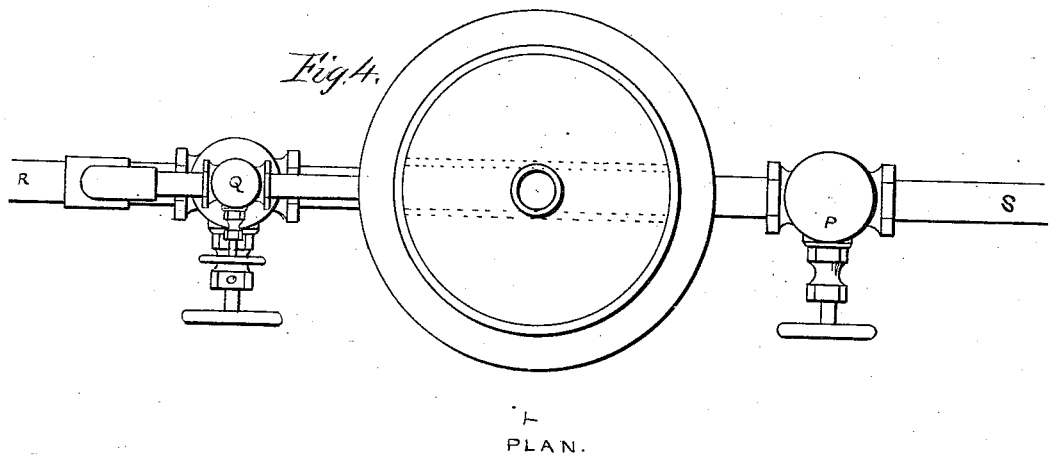
Figure 3:
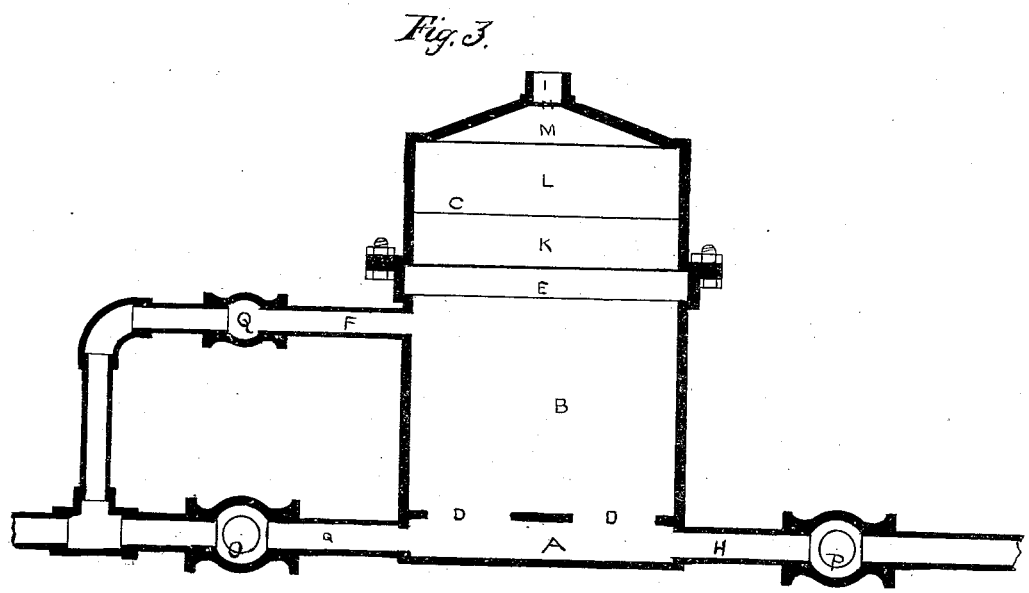

Figure 1 is a side elevation of the improved apparatus; Fig. 2, a transverse section; Fig. 3, a longitudinal section, and Fig. 4 a plan view.

The object of the invention is to cleanse water of its impurities, and this is effected by the improved apparatus, constructed as follows: T is a vessel, consisting of a wedge-shaped body, B, communicating at the bottom with a tubular chamber, A, and a cylindrical top, C, bolted to the body B. With the chamber A communicate the inlet-pipe G, provided with a valve, O, and the outlet-pipe H, provided with a valve, P, and a branch, F, provided with a valve, Q, extends from the pipe G to the top of the chamber B. A block or partition, E, rests upon a shoulder, $x$, at the top of the chamber B, and consists of wood, lava, or other porous material, and on this rests a body, K, of pulverized quartz, a second body, L, of charcoal, and a third, M, of sand, confined by a screen, N, below the outlet I. A gauze screen, D, separates the compartments A and B.

For filtering, the cock at O is opened, the cocks at Q and P being closed, and the water introduced into the chamber A. By the pressure in the service-pipe, the water is forced upward through section B; thence still upward through the pores of the plate E and the strata of filtering material, and through the pipe I.

For cleansing the filter, the process is as follows: The cock at Q is opened, and that at O is closed. The cock on the outlet-pipe H is also opened. The water is then received through the inlet-pipe F, next to and washes off the face of the plate E, and discharges at H, or, by the moving action of water on a line of service-pipe, opening the cocks at O and P, and closing that at Q.

Having thus described my invention, I claim as new and desire to secure by Letters Patent—

1. The combination, in a filter, of the compartments A and B, separated by a gauze partition, D, the compartment C, separated from B by a porous partition, E, and the pulverized filtering media, arranged within the compartments B and C, as set forth.

2. The combination, with the vessel containing the compartments A B C, of the pipes F G H I and valves O P Q, all arranged as set forth.

JOHN C. NICHOLS.

Witnesses:
J. H. JONES,
T. F. WINNE.